United States Patent [19]

Lisson et al.

[11] Patent Number: 5,530,514
[45] Date of Patent: Jun. 25, 1996

[54] DIRECT FOCUS FEEDBACK AUTOFOCUS SYSTEM

[75] Inventors: Jerold B. Lisson, Henrietta; Darryl I. Mounts, Pittsford, both of N.Y.

[73] Assignee: Eastman Kodak Company, Rochester, N.Y.

[21] Appl. No.: 277,444

[22] Filed: Jul. 19, 1994

[51] Int. Cl.$^6$ ............................................. G03B 3/10
[52] U.S. Cl. ............................................. 354/407
[58] Field of Search .................. 250/201.2–201.8; 356/1, 4; 348/345–357; 352/140; 354/400–409

[56] References Cited

U.S. PATENT DOCUMENTS

| | | | |
|---|---|---|---|
| 3,945,023 | 3/1976 | Stauffer | 354/25 |
| 4,643,557 | 2/1987 | Ishizaki et al. | 354/406 |
| 4,684,995 | 8/1987 | Baumeister | 358/227 |
| 4,697,905 | 10/1987 | Fujibayashi et al. | 354/406 |
| 4,818,865 | 4/1989 | Matsui et al. | 250/201 |
| 4,969,005 | 11/1990 | Tokunaga | 354/414 |
| 4,974,007 | 11/1990 | Yoshida | 354/402 |
| 5,049,916 | 9/1991 | O'Such et al. | 354/412 |
| 5,055,865 | 10/1991 | Fujino et al. | 354/127.11 |
| 5,202,555 | 4/1993 | Ishida et al. | 250/201.8 |

OTHER PUBLICATIONS

P. Carellas, "Everyday Optics", Optics and Photonics News, Sep. 1993, pp. 6, 7, 28.

Primary Examiner—Michael L. Gellner
Assistant Examiner—Eric Nelson
Attorney, Agent, or Firm—Joseph F. Breimayer; David A. Howley

[57] ABSTRACT

An improved auto focus system particularly adapted for use in a camera for automatic focus control of a camera taking lens having first and second linear arrays of photosensitive elements spaced apart laterally from one another and spaced apart in separate planes and first and second lenslets for imaging the scene to be photographed thereon. The system functions by autocorrelation of first and second signals output from the first and second linear arrays, employing parallax range derivation from the first and second signals to derive a motor drive signal, applying the motor drive signal to the taking lens focus adjustment mechanism to adjust the taking lens, employing contrast derivation from the first and second signals during adjustment of the taking lens, and halting adjustment of the taking lens when a position of best focus is indicated by the contrast derivation.

6 Claims, 5 Drawing Sheets

DIRECT FOCUS FEEDBACK AUTOFOCUS SYSTEM

FIELD OF THE INVENTION

The present invention relates to a camera having a passive, automatic focus system employing linear photosensor arrays and associated lens elements arranged for automatic focus of the camera taking lens through simultaneous parallax and image sharpness (contrast) techniques.

BACKGROUND OF THE INVENTION

In recent years, automatic focus or autofocus (AF) and automatic exposure (AE) video and still photographic cameras have come into common usage as integrated circuits, photosensors, e.g. linear CCD arrays, and miniaturized servo elements have decreased in cost and become more available, thereby allowing for systems capable of subject/object range finding used for the correction of taking lens focus positioning. In addition, the availability of inexpensive microprocessors, RAM and ROM chips, and other micro-controller components has allowed designers to incorporate sophisticated algorithms with active and/or passive range sensors for AF systems and with multi-segmented photometric sensor arrays for AE systems to provide the user with highly accurate "point and shoot" capabilities. These capabilities have been incorporated in relatively simple and inexpensive view finder photographic cameras and in highly complex and expensive single lens reflex (SLR) photographic still cameras using through-the-lens (TTL) optical systems, as well as in video cameras and in electronic still cameras.

In AF control systems, active and/or passive range finding AF systems have been developed to provide signals from which the distance between the camera imaging or taking lens and (typically) the subject or object (hereafter object) in the scene that the user has centered the imaging lens on can be determined and employed with a motorized imaging lens adjustment to adjust the position of the imaging lens for best image focus for the object distance.

One such range finding AF system employs one or more pairs of linear photosensor element arrays, e.g. CCD or photo diode linear arrays, that are positioned laterally in the same plane a fixed distance apart, which forms the baseline of the autoranging triangulation system, also referred to as a "parallax" AF system. In parallax AF systems, the baseline is a necessary dimension which allows for the formation of similar triangles as a deterministic means of computing object distance. Generally, as the AF baseline dimension and focal length increases and the linear sensor array width (pitch) decreases, the maximum sensing distance increases.

Typically, in the parallax range finding AF system, an array focusing lens is positioned with respect to each of a pair of separated co-planar, linear photosensor arrays on which the object image in SLR camera systems are focused. The array focusing lenses are arranged symmetrically with respect to the optical axis of the camera's imaging lens, and light passing through the lens (TTL) is diverted by a half silvered mirror through the pair of focusing lenses and onto the co-planar, linear arrays, e.g. as shown in U.S. Pat. Nos. 4,643,557 and 4,697,905. In such TTL AF systems, the imaging and taking lens is motor driven and the AF calculations are conducted during lens focus adjustment.

In non-TTL, or viewfinder, point and shoot, cameras, the pair of array focusing microlenses or lenslets and the associated pair of linear arrays of photosensitive elements are mounted on the camera a distance away from the taking lens. Typically, with equal number, photosensitive element arrays, both the pair of array focusing lenses and the taking lens are commonly motor driven in the adjustment of the lens focus.

Figure 1:
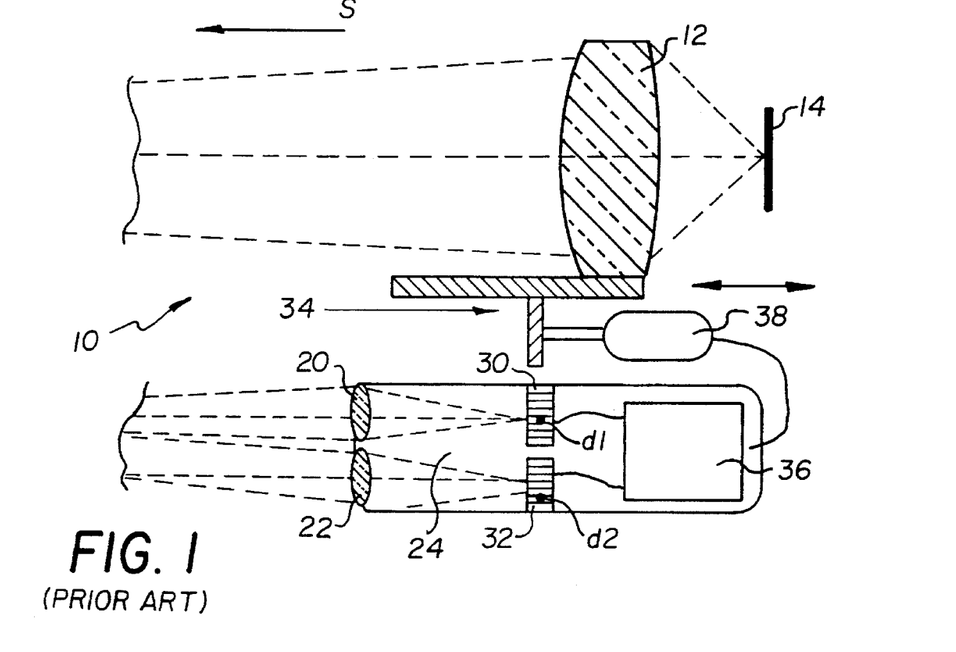
FIG. 1 is a simplified, schematic view of the parallax AF system known in the prior art.

FIG. 1 schematically illustrates the arrangement of these parallax AF components in a simplified fashion in a point and shoot camera. An object is imaged by a camera taking lens 12 in a lens-to-object cone 10 (representing the projection of a point on the object as projected on the aperture of the taking lens 12) onto a film plane 14 when the camera is aimed at the object. A pair of AF lenslets or microlenses 20, 22 are mounted in a microlens and linear array assembly 24 in alignment with the pair of photosensor or CCD linear arrays 30, 32 to focus object images thereon from the same portion of the object field. In the system of FIG. 1, a field lens (not shown, but corresponding to field lens 16 of FIGS. 3 and 4) conjugate to the microlenses 20, 22 may also be required to ensure that the microlenses 20, 22 are viewing similar parts of the object, so that the parallax computation will entail the required equivalent image as recorded on each sensor array. The CCD linear arrays 30, 32 are fixed in position, while the taking lens 12 is movable along its optical axis by a motor driven gear or other suitable lens adjustment mechanism 34 to adjunct the camera lens-to-object distance S.

As indicated above, the parallax, $\tau$, of the object images as focused on the two linear CCD arrays 30, 32 of the microlens and linear array assembly 24 is computed by autocorrelation of the signal sets d1, d2 output from the pair of CCD linear arrays 30, 32 to the micro-controller 36. The signal sets d1, d2 are developed by read-out of the linear CCD array elements, that have recorded equivalent object images, by the micro-controller 36. The computed autocorrelation lag coefficient $\tau$ then yields a direct measure of the relative displacement (parallax $\tau$) of the object image at the camera from which the camera taking lens-to-object distance, S is calculated. A fundamental equation relating the measured displacement to a required change in imaging lens 12 position to achieve the position of best focus is used to deterministically compute the correct position for taking lens 12 and to derive a lens motor drive signal in the micro-controller 36. A lens focus drive motor 38 is energized by the motor drive signal which adjusts the lens adjustment mechanism 34 to drive the imaging or taking lens 12 to the best focus position.

The operation of a typical passive AF system of this type incorporated into an SLR camera using TTL optics is described in the above-referenced '557 patent to Ishizaki et al (incorporated by reference herein in its entirety). In the TTL environment, the object image is transmitted to the microlenses through the camera taking lens and a field lens.

Passive AF systems employing parallax suffer from signal-to-noise problems in low ambient light conditions resulting in use of active range finding systems where a light beam, e.g. a laser or LED or infrared light beam, is emitted by the camera and directed onto the object in the scene to be focused on. The reflected light is imaged on the AF system linear arrays, and the camera to object distance is calculated by the parallax methods. Such a combined active and passive AF system is disclosed in U.S. Pat. No. 4,818,865, wherein the active AF system LED emission is invoked automatically at low ambient light levels.

Figure 2:
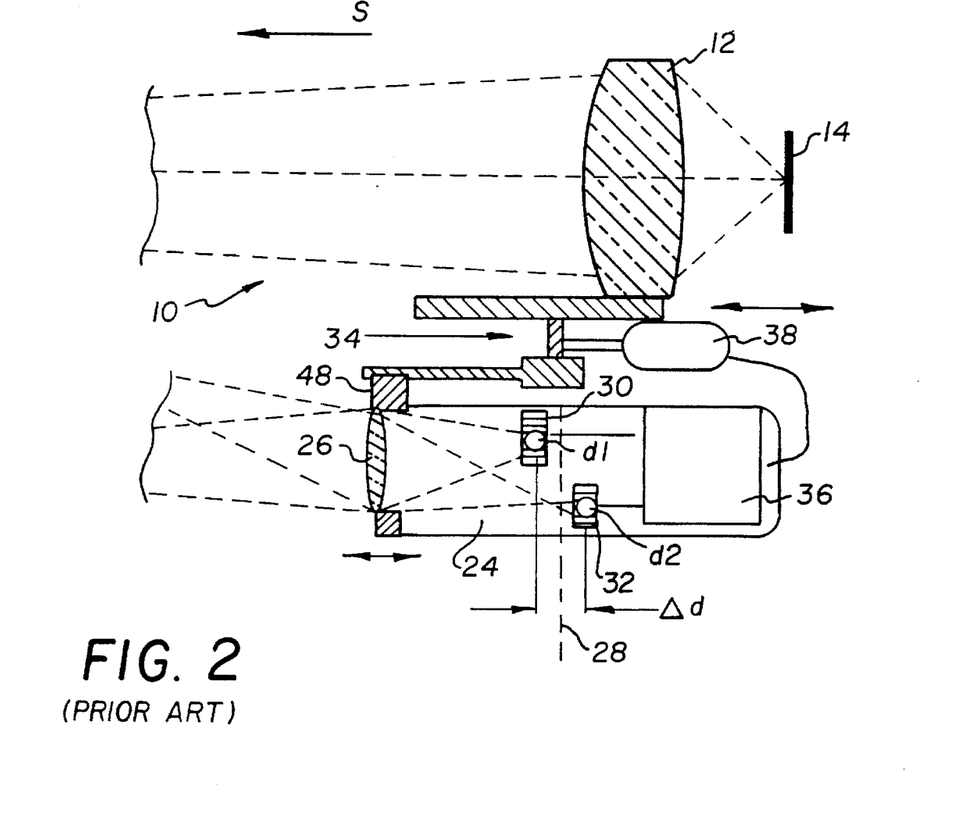
FIG. 2 is a simplified, schematic view of the image sharpness or contrast AF system known in the prior art.

A contrast AF system for a point and shoot camera is depicted in FIG. 2 wherein the object is imaged by a single AF lens 26 onto the two photosensor arrays 30, 32 positioned in spaced apart (along the optical axis), parallel planes. The contrast AF system determines object best focus position based on the differential intensity in terms of variance (RMS squared) or integrated intensity as recorded on the two photosensitive arrays.

As shown in FIG. 2, the single AF lens 26 has an optimal focus that is optically conjugate along the broken line defining the sensor image plane 28 with the camera film plane 14. A key feature of the image sharpness or contrast AF system is that the linear arrays 30, 32 are now displaced with respect to each other along the optical axis of the single lens element 26 that forms the object image in the sensor image plane 28 by a distance Δd. The single AF lens 26 is mechanically coupled to move with the lens adjustment mechanism 34 for adjusting the imaging lens 12, while the linear arrays 30, 32 are fixed in their separate planes. In a TTL camera, the taking lens replaces the single AF lens 26 of FIG. 2, and the sensor plane (bisecting the distance between the two spaced apart sensor arrays) is conjugate to the image or film plane of the taking lens.

When the taking lens 12 is in focus for an object associated with the lens-to-object cone 10, for say the camera lens-to-object distance S, the single AF lens 26 will have been set to provide the object's image ideally focussed at the sensor image plane 28. Therefore relatively blurred object images that are equally de-focussed are also imaged at each of the linear arrays 30 and 32. In this case, the blur circles due to de-focus will be equivalent in spread and result in similar de-focussed image blur patterns which result in corresponding sets of electrical output signal amplitude patterns that are essentially equal in intensity and shape. A spatial correlation of the two sets of signal patterns produced by the two linear arrays 30, 32 may be made in the micro-controller 36. The peak magnitude obtained from correlation of the two de-focussed sensor images will be maximal for the condition of FIG. 2 where the plane of best focus for the object at S is midway between the planes of the sensor arrays 30, 32. This "peak correlation" condition is due to the principle that the reduction of image intensity recorded by either of the arrays will fall at a faster rate as de-focus error increases than the rate at which the intensity rises as best focus is approached. Thus, as the object distance varies from the S location, the intensity on the array 30 or 32 closer to object focus will increase, but at a slower rate than the rate of intensity decrease for the array farther from object best focus.

Thus, in principle, the AF sensor image peak correlation will only be maximal when the object is focused by the AF microlens 26 in the sensor image reference plane 28 midway between the planes of the linear arrays 30, 32. This reference plane 28 position of maximum peak correlation is calibrated to the film plane 14. When the object is focussed at sensor reference plane 28, the resulting maximal peak correlation of the sensor array images indicates that the taking lens is at the best position for objects at lens-to-object distance S. A maximal peak correlation result for an arbitrary taking lens 12 position indicates that the object is at the best focus position, and the image of the object is in focus at the film plane 14.

If the actual camera lens-to-object distance S should change, the peak correlation will decrease also indicating that the taking lens 12 is not focussed at the film plane 14. The linear array 30 or 32 with the greatest intensity output indicates the direction of focus shift and the direction that the taking lens 12 should move to regain best film plane focus. When the AF drive motor 38 is thereby commanded to move the taking lens 12 in the correct direction, the taking lens 12 and the AF lens (or the linear arrays 30, 32) are driven relative to the object, thereby resulting in an increase in the maximum peak correlation of patterns of the signal sets provided by the linear arrays 30, 32 to the microcontroller 36. When the peak correlation has again been reached, the AF drive motor 38 is de-energized and the taking lens 12 and single AF lens element 26 cease movement.

Problems to be Solved by the Invention

Passive and active AF systems employing parallax also have limitations in the range of distances that they can be used accurately. As camera lens-to-object distance S increases, accuracy falls off. Active AF systems employing parallax are more expensive and can be fooled by reflective surfaces or rendered ineffective by absorbance of the emitted light. The parallax AF system also only determines an estimate of lens-to-object distance from which taking lens focus error is computed, and feedback is not possible as the lens is adjusted.

In addition, parallax AF systems have difficulty in deriving accurate estimates of lens-to-object distances in scenes that are either highly complex or have low contrast. The resulting taking lens setting may oscillate or may be driven to an extreme fixed position.

In the sharpness or contrast AF system of FIG. 2, focus intensity is directly sensed, but it must find a peak magnitude via autocorrelation (or by direct intensity comparisons of each array output) by moving the sensor lens (and the commonly connected taking lens) in order to find the peak value, thereby reducing AF sensor bandwidth.

SUMMARY OF THE INVENTION

It is therefore an object of the present invention to provide an improved autofocus control system that is simple, inexpensive and robust comprising at least one pair of linear photosensitive elements combined on a single integrated circuit substrate.

It is a further object of the present invention to provide an integrated or composite AF system for a camera taking lens effected through both parallax and contrast techniques employing AF image sensors and associated imaging lenses formed in a combined microlens and sensor assembly.

These and other objects of the present invention are realized in an improved auto focus system particularly adapted for use in a camera for automatic focus control of a camera taking lens which functions by autocorrelating the first and second signal sets output from photosensitive elements of first and second linear arrays, employing parallax range derivation from the first and second signal sets to derive a motor drive signed, applying the motor drive signal to the taking lens focus adjustment mechanism to adjust the taking lens, employing contrast derivation from the first and second signal sets during adjustment of the taking lens, and halting adjustment of the taking lens when a position of best focus is indicated by the contrast derivation.

During the parallax range derivation, the first and second signals are compared through autocorrelation to derive an autocorrelation lag coefficient used to compute an estimate of the lens-to-object distance and from that distance, to deterministically calculate the best focus position for the taking lens. Then, the motor drive signal is generated and applied to the taking lens adjustment mechanism to drive the taking lens to the calculated best focus position.

During the adjustment of the taking lens, the peak magnitude of the autocorrelation of the signal sets is monitored. If the object is significantly de-focussed for the initial taking lens position, the magnitude of the peak autocorrelation will begin to increase relatively rapidly as the taking lens begins movement towards the best focus position. As the rate of change of the autocorrelation peak magnitude begins to decrease towards zero, the taking lens motor drive mechanism is disabled. The camera shutter mechanism is then enabled for best in-focus photography.

In order to adjust focus of the object imaged by the taking lens on a camera image recording plane through adjustment of position of the camera taking lens with respect to the image recording plane, in accordance with this improved function, the system comprises first and second linear photosensitive element arrays each comprising a plurality of photosensitive elements, first and second auto focus lenses mounted in relation to the camera taking lens means for directing images of the object on the first and second linear arrays, respectively, the first and second linear arrays positioned in first and second respective planes located a fixed distance apart along the optical axes of the respective first and second auto focus lenses, the first and second linear arrays further positioned in alignment with the optical axes such that the first and second linear arrays are also separated by a fixed baseline distance, such that the images of the object on the first and second linear arrays develop auto focus signals by autocorrelation of the signals output from photosensitive elements reflecting both contrast and parallax derivation of focus control signals for adjusting focus of the camera taking lens.

Advantageous Effects of the Invention

Advantageously, the Direct Focus Feedback Auto Focus (DFF AF) system operates on a closed loop principle using the peak autocorrelation of the contrast AF derivation as a feedback signal for confirming the position of best focus that the taking lens is driven toward by the motor drive signal derived by parallax AF processing of the first and second signal sets. This feedback and confirmation increases accuracy and reduces AF sensitivity to noise/variation in design and manufacturing tolerances or environmental effects involving temperature, humidity and shock. Of course, this is in addition to the increase in accuracy obtained from two independent estimators of focus error—the range of the object and the maximal peak autocorrelation magnitude.

The magnitude of the peak autocorrelation ($AC_{Pk}$), in certain situations involving low contrast imagery, can improve AF accuracy because it results from a computation using all the sensor image data in contrast to the corresponding lag coefficient which is based on the relative shift of the images. In the former case, there is more opportunity for averaging image noise (e.g., Johnson or thermal noise), thereby improving the signal-to-noise auto focus detection.

The DFF AF system synergistically combines the two basic methods of focus error detection into a single AF component that increases the accuracy and reliability of the commonly used AF systems of FIGS. 1 and 2 in both point and shoot and SLR cameras. This is a fundamental expectation because the combined principles used in DFF AF are supportive and synergistic in the sense that for certain objects/object illumination conditions where one system is weak, the other may be strong, and vice versa.

An added major advantage of the DFF AF system is its robustness to adverse environmental effects. For example, temperature gradients or accidental shock may perturb the factory set focus position. The pure parallax AF system based on distance sensing would not compensate for such effects regardless of the shift in the plane of best focus due to such perturbations. In the DFF AF system, the feedback from the sharpness signal ensures that the final taking lens positioning is at the plane of best focus; the plane of maximal image irradiance (contrast) sensing is sensitive to any focus variations induced by environmental perturbations.

BRIEF DESCRIPTION OF THE DRAWINGS

These and other objects, advantages and features of the invention will become more apparent in the detailed description of the preferred embodiments thereof presented below in reference to the accompanying drawings, in which like elements are denoted with like reference numbers, and in which.

DESCRIPTION OF THE PREFERRED EMBODIMENTS

The present invention combining the image sharpness and parallax techniques in a robust AF system for a wide range of imaging products—from electronic, video and photographic cameras to printers and copiers. For exemplary purposes, cameras only are discussed in the preferred embodiment of the invention described and illustrated herein.

Figure 3:
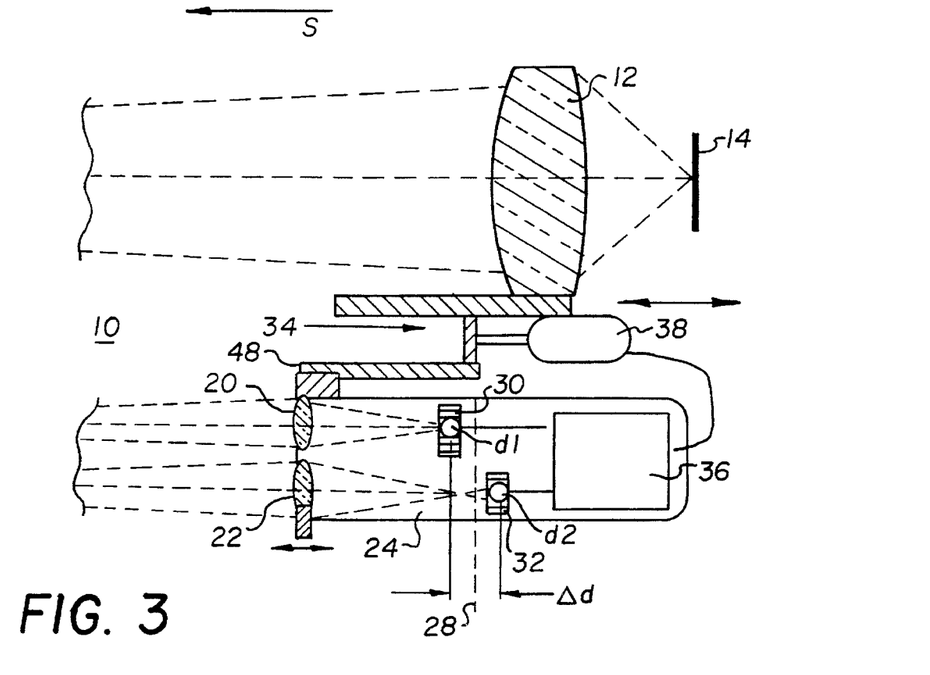
FIG. 3 is a simplified, schematic illustration of the combined parallax and image sharpness DFF AF system of the present invention in a view finder camera application.

The DFF AF system for a view finder camera is depicted schematically in FIG. 3. The system includes a pair of AF microlenses 20, 22 that are mounted in the microlens and array assembly 24 in movable relation to the fixed pair of photosensor or CCD linear arrays 30, 32 to focus object images thereon. The two linear arrays 30 and 32 are laterally spaced apart a predetermined distance in side-by-side relation in the fashion of the parallax AF configuration of FIG. 1 and are also spaced apart in parallel planes along the auto focus optical axis a fixed distance Δd apart in the fashion of the image sharpness (contrast) AF configuration of FIG. 2. The sensor reference plane 28 is along the optical axis midway between the planes of the CCD linear arrays 30, 32.

The pair of AF microlenses 20, 22 are movable with the taking lens 12 which is itself movable by the adjustment mechanism 34 through operation of the drive motor 38 under control of the drive signal output by the microcontroller 36 to adjust the camera lens position for an object at lens-to-object distance S such that its image is brought into focus on the film plane 14.

Figure 4:
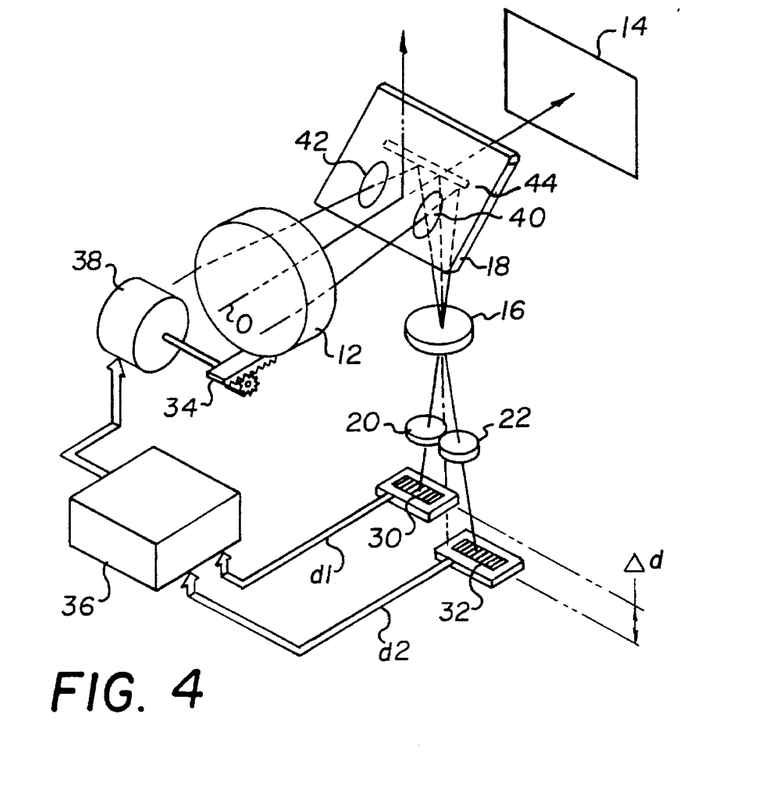
FIG. 4 is a simplified, schematic illustration of the combined parallax and image sharpness DFF AF system of the present invention in a TTL camera application.

In the TTL camera application of the DFF AF system depicted in FIG. 4, the taking lens 12 is depicted in relation to the image receiving or film plane 14 so that an image of the object is projected onto the plane when quick return mirror 18 is flipped up in the typical SLR exposure operation. The quick return mirror 18 is depicted in the down position for pre-exposure operations with semi-transmissive spot areas 40, 42 thereon for transmitting an object image through the mirror 18 and onto a further mirror 44 mounted behind mirror 18. The object image is reflected by mirror 44 and is imaged by field lens 16 through the microlenses 20, 22 onto the respective CCD linear arrays 30, 32. The field lens 16 ensures that the same portion of the object is being directed to the microlenses 20, 22 in the illustrated TTL embodiment, but may not be necessary, depending on the design.

The CCD linear arrays 30, 32 are spaced apart laterally as well as by the distance $\Delta d$ along the auto focus optical axis in parallel planes. Sensor reference plane (not shown) is midway between the parallel planes containing CCD linear arrays 30, 32. The first and second signal sets, d1 and d2 developed and read out of the CCD linear elements 30, 32 are applied to the micro-controller 36 to develop the motor drive signal applied to drive motor 38. The drive motor 38 responds by rotating a drive gear of a rack and pinion drive mechanism 34 to adjust the taking lens 12.

In the manner described above with respect to FIG. 1, the parrallax AF technique may be initially employed, as the object image is imaged on the photosensor linear arrays 30, 32 by the AF microlenses 20, 22, by the micro-controller to derive the parallax signal $\tau$. The parallax signal $\tau$ is used to derive the camera lens-to-object distance S deterministically.

To summarize, a new camera lens-to-object range is obtained, using the value of the computed lag coefficient $\tau$ via the correlation of the signals output by the elements of the linear arrays 30, 32. The result provides an estimate of the magnitude and direction that the imaging lens 12 must be moved to obtain the best film plane focus of the object. With the camera lens-to-object distance S determined, the microcontroller develops and applies a motor drive signal to drive motor 38 that drives the taking lens 12 to the best focus position distance S.

At the same time, in FIG. 3, image contrast focus criteria may also be employed because of depth displacement $\Delta d$ of the photosensor linear arrays 30, 32 on which the separate images of the object are directed by the separate microlenses 20, 22. Since the AF microlenses 20, 22 move via a common linkage 48 with the taking lens 12, the magnitude of the peak image autocorrelation $AC_{Pk}$ will increase until the best film plane focus for the taking lens 12 has been obtained. The signal to the drive motor 38 is halted when the change in the magnitude of the peak autocorrelation $AC_{Pk}$ signal decreases toward zero. Thus, maximal camera lens-to-object distance information S is extracted from the computation of autocorrelation of the signal sets d1, d2 output by the linear arrays 30, 32 as the intensity of the autocorrelation magnitude of the images recorded on the arrays increases with movement of the AF microlenses 20, 22 through the linkage 48 and as the object is imaged at the plane 28. Specifically, the maximum peak correlation $AC_{Pk}$ is used in the image sharpness AF system and, simultaneously, the associated lag coefficient $\tau$ value which yields the relative displacement (parallax $\tau$) of the object images at the linear array planes for the parallax AF system may both be employed.

The combination of the contrast AF control with parallax AF control increases the potential robustness of the AF achieved and is accomplished using the same algorithm now utilized in the parallax AF sensor of FIG. 1. Thus, the DFF AF uses the autocorrelation algorithm, but in addition, due to the distancing of the two CCD linear arrays 30, 32, by $\Delta d$, develops a feedback signal that is directly associated with focus error in contrast with parallax which is indirectly involved through the range finding calculation. Thus sharpness AF sensing is inherently faster than the parallax approach in that, in principle, a deterministic calculation may be avoided. When further movement of the AF microlenses 20, 22 fails to increase the magnitude of the peak autocorrelation $AC_{Pk}$, the best focus position for the taking lens 12 has been attained, and the camera shutter mechanism is enabled.

Figure 5A:
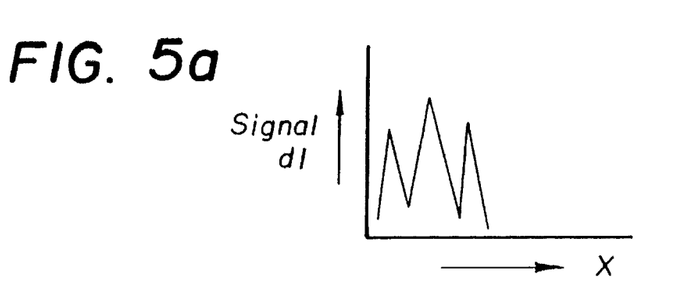
FIGS. 5a, 5b, 5c are a graph depicting the signal processing in accordance with DFF AF evidencing an in-focus condition.
Figure 5B:
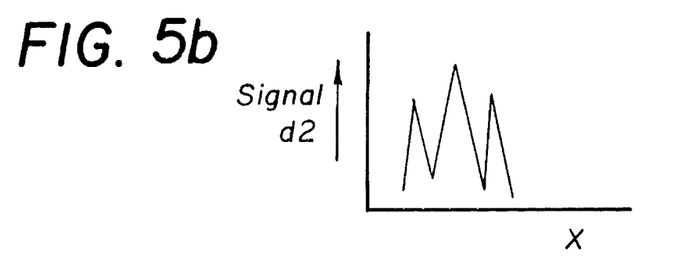
Figure 5C:
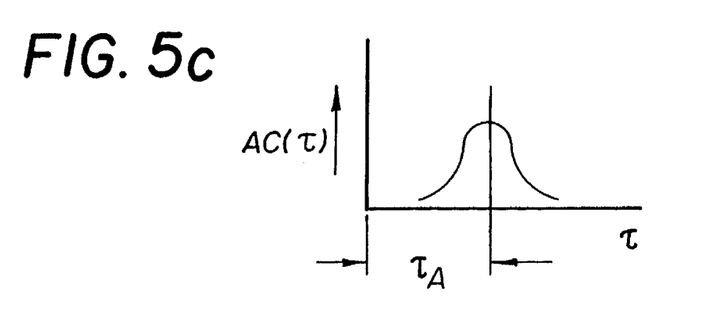
Figure 6A:
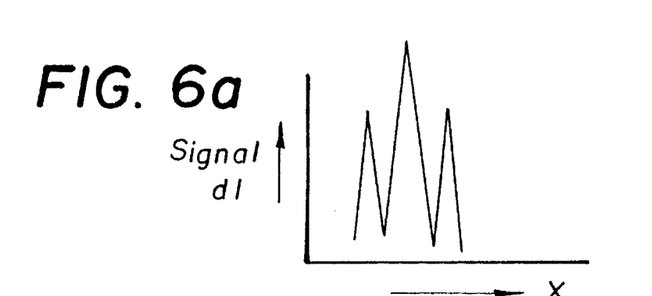
FIGS. 6a, 6b, 6c are a graph depicting the signal processing in accordance with DFF AF evidencing an out of focus condition.
Figure 6B:
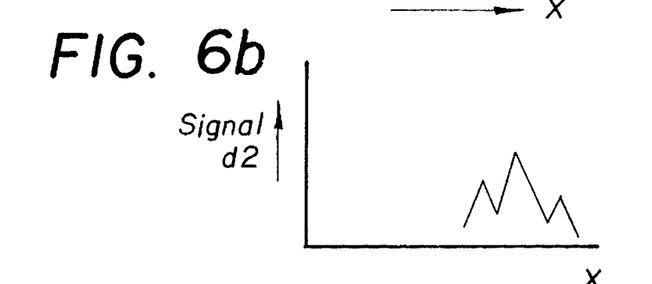
Figure 6C:
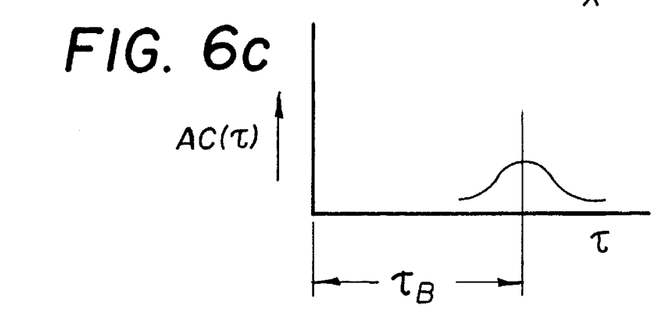

FIGS. 5 and 6 are graphs depicting the signal processing in accordance with DFF AF evidencing an in focus and an out of focus condition, respectively. The tracings of FIG. 5 are indicative of an object in focus. The tracings of FIG. 6 are of an object not in focus e.g. an object that has moved from the position of FIG. 5 or was initially out of focus when the camera was aimed. A comparison of the tracings of FIGS. 5 and 6 graphically shows the change in the image intensity patterns of the signal sets d1 and d2 in tracings (a) and (b) and the resulting loss of correlation of the image intensity patterns in tracing (c) as the object position shifts from an in focus position to an out of focus position. The output signal amplitude distribution across the elements of the CCD linear arrays 30 and 32 due to the object image intensity pattern is depicted in tracings (a) and (b), respectively, in each FIG. 5 and 6. The autocorrelation signals $AC(\tau)$, $(\tau_A - \tau_B)$ of the signal amplitudes distributed in the tracings (a) and (b) are shown in autocorrelation peak tracing (c).

Comparing tracing (c) in FIGS. 5 and 6, the relative shift ($\tau$), $(\tau_A - \tau_B)$ of the maximum peak $AC_{Pk}$ of the autocorrelation signals $AC(\tau)$ allows the computation of the new object distance. The reduction of the peak autocorrelation magnitude $AC_{Pk}$ in tracing (c) of FIG. 6 relative to the corresponding result of FIG. 5 illustrates the sensitivity of the sharpness AF system to focus error.

Comparing tracings (a) and (b), the relative increase in the intensity pattern of signal set d1 relative to the intensity pattern of signal set d2, in FIG. 6, indicates that the best focus for the AF sensor and the taking lens has shifted in the direction of the plane of the sensor array generating the signal set d2 (linear array 32 in FIGS. 3 and 4). As the taking lens 12 is brought into focus, the intensity pattern of signal set d1 derived by linear array 30 appearing in tracing (a) of FIG. 6 decreases in amplitude to that pattern appearing in tracing (a) in FIG. 5, and the intensity pattern of signal set d2 derived by linear array 32 appearing in tracing (b) of FIG. 6 increases in amplitude to that appearing in tracing (b) in FIG. 5.

Figure 7:
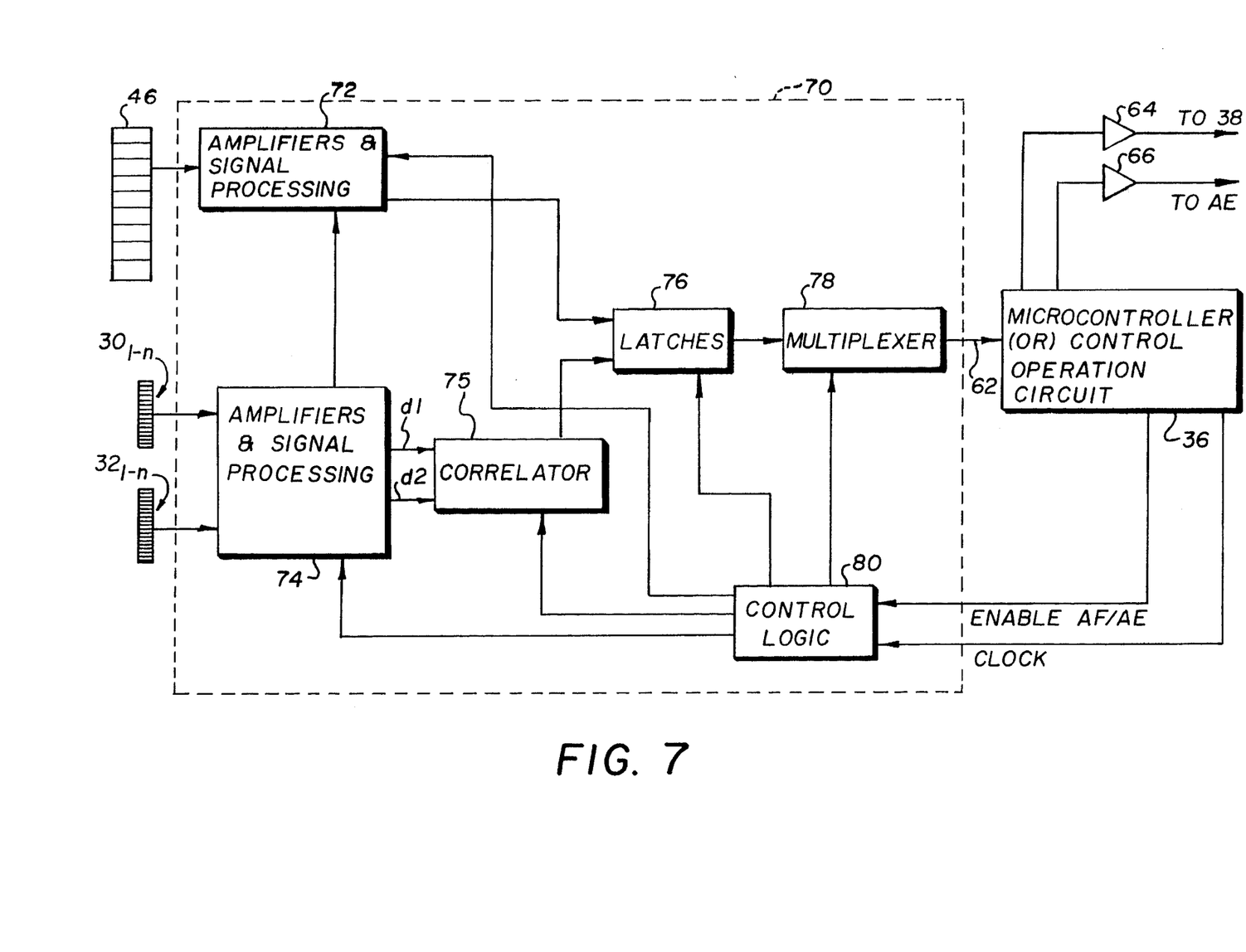
FIG. 7 is a circuit block diagram of an automatic exposure and automatic focus control system employing a photometric array and the DFF AF system of the present invention.

Turning now to FIG. 7, it illustrates in part the electronic operating system of a camera in which the DFF AF system and functions described above in reference to FIGS. 3–6 may be implemented. In this regard, commonly assigned U.S. Pat. No. 5,049,916 to O'Such et al describes a comprehensive camera operating system employing a microcomputer system and associated hardware operated under the control of stored algorithms for controlling all of the functions of the camera described herein and other functions and operations common to current electronically controlled photographic cameras. In accordance with the present invention, that portion of the camera operating system relating to use of the DFF AF systems of FIGS. 3 and 4 are described in detail while the other operating systems of such a camera disclosed in the '916 patent are incorporated herein by reference.

In this regard, the micro-controller 36 will be understood to include a microprocessor, read only memories (ROMs), random access memory (RAM), communication ports and input and output latches and buffers all interconnected through address and data lines and buses. The camera micro-controller 36 also receives inputs from other camera transducers, such as an auto exposure control system, a camera orientation sensor, filmstrip and filmstrip cartridge data decoders and a camera-user interface. The user interface may be as simple as a shutter button or may embody additional features such as multiple light metering modes and override command switches. If the camera is a telephoto or zoom model, the taking lens focal length may also be accessed by the micro-controller 36 from the zoom lens and the zoom position indicator.

Micro-controller 36 thus contains interrupt circuits, control and power circuits and input buffers and latches and the like for responding to these various status and control input signals and others, such as the state of the shutter release button, the motor advance mechanism, flash unit specifications, characteristics of the film in the camera, and the like. The output latches and drivers are employed to store temporarily and apply control signals to the shutter release, photoflash, film advance motor drive, imaging lens servo control system for the DFF AF function of the present invention, and lens aperture and/or shutter speed control for AE, etc.

For the purposes of describing the present invention, FIG. 7 illustrates the signal processing circuitry for providing ambient light intensity and range finding data on a data line 62 to the micro-controller 36 which provides control signals to an exposure adjustment driver 66 for effecting automatic exposure (AE) control and a focus adjustment driver 64 for actuating and driving the lens drive motor 38 for AF control in the manner described above. Other inputs and outputs from the micro-controller 36 conventionally employed in such cameras are not illustrated in FIG. 7. The AE calculation and control components depicted in FIG. 7 and described below are not shown in the preceding FIGS. 1–4.

The AE and AF circuit block diagram 70 includes a first set of amplifiers and signal processing circuits 72 that are coupled to a segmented two-dimensional photometric sensor array 46 and a second set of amplifiers and signal processing circuits 74 that are coupled to the first and second linear arrays 30, 32. The first and second linear arrays 30, 32 comprise n photodiodes or CCD elements $30_1$–$30_n$, $32_1$–$32_n$. The photocurrent output signals from each of the n elements $30_1$–$30_n$, $32_1$–$32_n$ in the range sensor linear arrays 30, 32 and the output signals from the photometric array 46 are applied to conventional amplifier and signal processing circuits 74 and 72, are converted from current to voltage signals, amplified, subjected to logarithmic compression, and converted from analog to digital data output signals in a manner known in the art. The digitized output signals from the amplifier and signal processing circuit 74 are applied to the correlation and interpolation circuit 75 which provides output signal data to the latches 76 as described hereafter. The latched data is applied to the multi-plexor circuit 78 which serially outputs the data onto the data line 62 for the micro-controller 36 in a sequence described with reference to FIG. 8. These components of the AE and AF circuit block diagram 70 are not shown in FIGS. 1–4 for simplicity of illustration.

Figure 8:
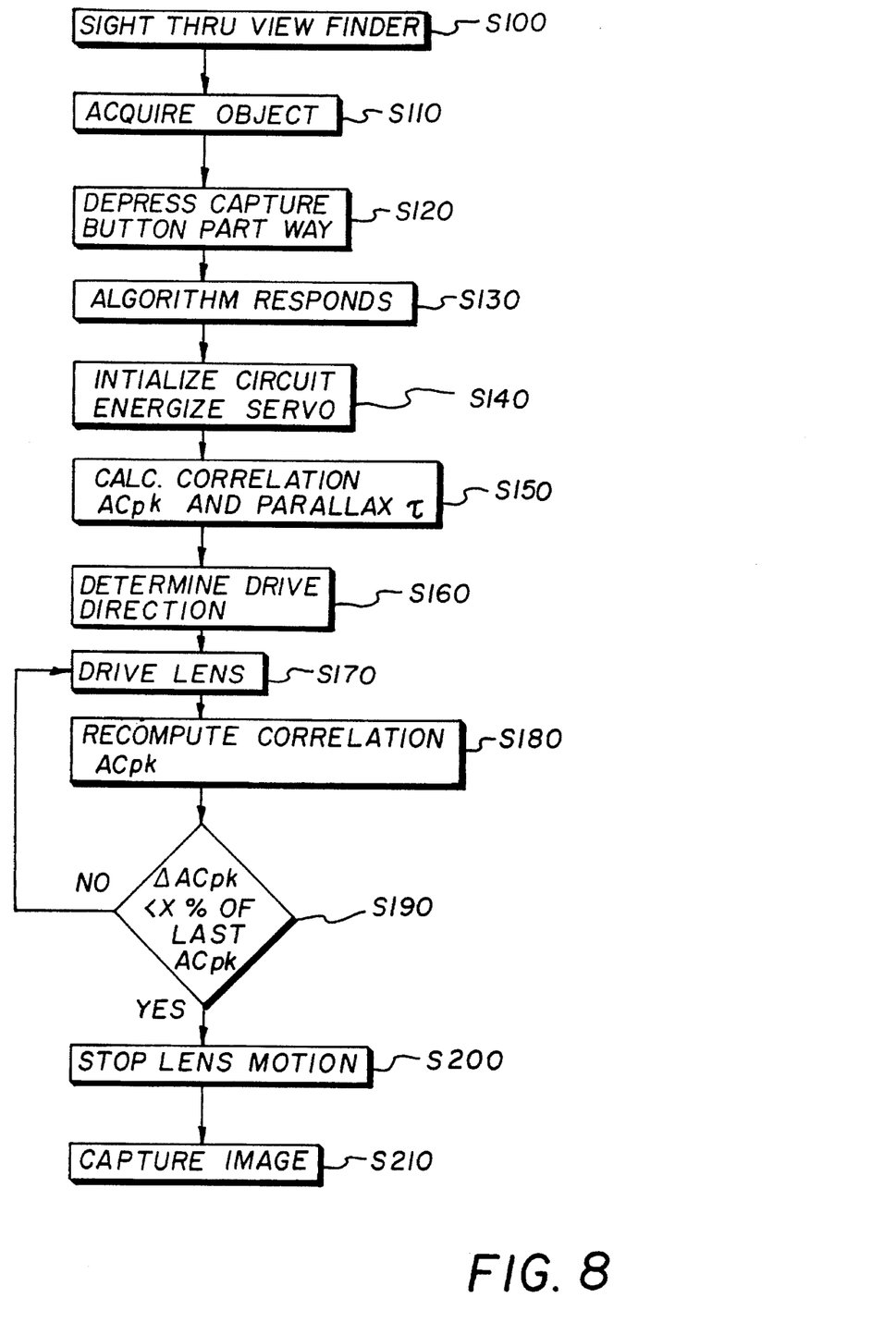
FIG. 8 is a simplified flow chart of the sequence of operation of the camera in making an exposure employing the autofocus control signals of FIGS. 5 and 6 and the DFF AF system of the present invention.

FIG. 8 shows a flow diagram of all the operational steps of making an exposure with an automatic camera of the type described above. The photographer first views the scene to be photographed through the viewfinder at step S100, typically centers the viewfinder on the principal object of interest in the scene (step S110) and then partially depresses the image capture button (step S120). The micro-controller stored algorithm responds to the partial button depression interrupt at step S130 and initializes the circuit in step S140. The micro-controller provides the Enable AF and Enable AE commands to the control logic 80. The control logic 80 sequentially or simultaneously enables the amplifier and signal processing circuits 72 and 74, latches the digitized intensity signal values in latches 76 and transfers the data to the data line 62 through the multi-plexor 78. The configuration and operation of the AE array 46 is not pertinent to the present invention, and only the DFF AF operations are described in FIG. 8.

The auto focus amplifier and signal processing circuits 74 convert the radiation intensity of light from the portion of scene impinging over time on each of the n elements $30_1$–$30_n$, $32_1$–$32_n$ to an electrical signal of varying intensity. Each CCD or other photosensitive element is connected to a comparator circuit in the amplifier and signal processing circuits 74, such that when the linear range sensor arrays 30 and 32 are enabled, the collected photocurrent signal from each element is measured, and when all the comparators' thresholds have been met, the light sensing is complete. This is necessary because lower light level scenes require longer integration times from the elements. After the last element photocurrent signal has met the minimum threshold, the respective pair of light intensity related signal sets (d1 and d2 in FIGS. 5 and 6) generated thereby can be amplified, processed and applied to the correlation and interpolation circuit 75 to develop the digitized signals latched in latches 76.

Correlating of the first and second linear array light intensity related output signal sets d1 and d2 is conducted in the correlation and interpolation circuit 75 and in step S150 in FIG. 8. The light intensity pattern signal sets d1 and d2 are autocorrelated and the value of the lag coefficient $\tau$, (i.e., the parallax $\tau$) as obtained from the autocorrelation signal $AC(\tau)$ is computed in the correlator circuit 75 and stored in the latches 76. The magnitude of the maximal peak autocorrelation $AC_{Pk}$ is also obtained from the signal pattern correlation to supply the starting feedback information with respect to taking lens best focus positioning and is stored with the associated lag coefficient $\tau$ in the latches 76.

When the value of the lag coefficient $\tau$ and the maximal peak autocorrelation $AC_{Pk}$ are computed by correlator circuit 75, an incorporated interpolation function can be used to improve the peak autocorrelation $AC_{Pk}$ estimates found between successive calculations. This filtered result is stored in latches 76 and applied to the micro-controller 36 via multiplexor 78 under control of the control logic 80. Finally, default conditions can also be sent to the latches 76 based on abnormal conditions found through the correlating and interpolation functions, such as $AC_{Pk}$ below threshhold.

The micro-controller 36 responds to the latched autocorrelation signals $AC(\tau)$ by deterministically computing the correct position for taking lens 12 from the value of the lag coefficient $\tau$ in step S150 and deriving a lens motor drive direction signal in step S160. The latched signal values applied on line 62 are offset derived from this correlation function in the micro-controller 36 to produce a digital representation of the distance S through the principals of triangulation.

In addition to the computation of the lag coefficient $\tau$ and the maximal peak autocorrelation $AC_{Pk}$, the intensity variance or integrated intensity from each of the AF sensor arrays 30, 32 are computed in step S150 by the correlator circuit 75 and is used to determine the direction of the focus shift caused by any change in lens-to-object distance S as described earlier. This result is also stored in latches 76 and transmitted via the multi-plexor circuit 78 to the micro-controller 36 for use in assessing the direction and attainment of best taking lens positioning. The drive direction may thereby be derived in step S160 from the intensity variances thereby improving the likelihood of the correct drive direction selection for low signal-to-noise conditions at the auto focus sensor arrays. Alternatively, and perhaps preferably, the drive direction may be initially derived from the parallax range finding function, and the intensity variance may be used to confirm the drive direction, particularly in the case of a moving object. The drive direction may thereby be derived in a redundant fashion.

The drive motor is energized, and the taking lens adjustment mechanism is driven, in step S170 by the drive signal generated by micro-controller 36 and applied to the focus adjustment driver 64. As the drive signal is applied in step S170, the sharpness AF algorithm is invoked in steps S180 and S190, and autocorrelation continues as the taking lens moves. In step S180, the micro-controller 36 derives the autocorrelation peak magnitude $AC_{Pk}$ and derives the change in the autocorrelation peak $\Delta AC_{Pk}$ by successive comparison of latched autocorrelation signals $AC(\tau)$. The micro-controller 36 compares the change in the peak magnitude $\Delta AC_{Pk}$ to a threshold percentage of the previous autocorrelation peak magnitude $AC_{Pk}$ in step S190. When the change is less than the threshold (e.g. 1% in a typical case), the lens movement is halted in step S200 by the micro-controller 36 sending an appropriate stop motion signal to the focus adjustment driver 64. The focussed image is captured by full depression of the enabled image capture or shutter release button in step S210.

The position of best focus may also be confirmed in step S180 by computation of the intensity variance as the taking lens is adjusted, seeking a null in the difference in intensity variance of the first and second arrays at the best focus position of the lens. The intensity variance for each AF array is obtained by computing the mean intensity signal value for the array over all photosensitive elements, subtracting the recorded intensity signal value at each photosensitive array element from the mean signal value, squaring the difference, summing the squared difference values, and dividing by the number of recorded intensity values. This is alternatively referred to as the RMS-square of the array intensities for each array.

It is to be noted here that if the photographer releases the half-depressed image capture button, the AF operation and the AE operation are halted, and the camera returns to the initial start block (step S100). The photographer, while keeping the button in the half-depressed position, may also change the scene framing until a desired composition is attained, and then further pushes the shutter button to the full stroke. If the desired scene is framed at the outset, the photographer may depress the shutter release button in a continuous stroke. In either case, the steps of FIG. 8 may be completed in the time it takes to steady the camera and frame the object. Typically, the operation steps of FIG. 8 may be completed in 50–60 ms.

Although not specifically shown, it will be understood that an additional step of assessing the general scene light level at the depression of the shutter release button may cause the emission of a low intensity light beam, e.g., an infrared emitting diode beam that illuminates the object sufficiently to allow the range finding operation to take place more rapidly.

The DFF AF system and function has been described in relation to one pair of CCD linear arrays 30, 32 and associated AF lenses 20, 22, 26 operating to provide the signal sets for both the parallax and contrast derivations. It will be understood that a camera implementation may separate the parallax and contrast AF systems by using two respective sets of photodiode or CCD linear arrays and AF microlenses in related or unrelated geometric layouts. Moreover, it would be possible to include more than one such DFF AF system with the AF lens and CCD linear arrays in various geometric orientations, e.g. in a horizontal and a vertical aspect so the object is view in orthogonal planes, for ceiling detection or the like.

In addition, it will be apparent to those skilled in the art that three photo diode or CCD linear arrays and associated AF lenses may be used in such various geometric orientations. In a three array/lens system, two of the arrays may be dedicated to the parallax AF system, and the third array, in conjunction with one of the first two arrays, may be used for sharpness AF sensing. Such a configuration of three arrays/lenses may improve the parallax sensing signal-to-noise performance when the object is at the best focus position.

In addition to the peak autocorrelation magnitude, various other sharpness algorithms may be used. For example, the variance of the intensity signal set d1 recorded on linear array 30 can be simply subtracted from the intensity signal set d2 recorded on linear array 32. When the sensor plane of best focus bisects the longitudinal distance $\Delta d$ between the linear array planes, the variances will be essentially equal, and the difference will be close to or at zero or null. In this manner, the sharpness or contrast signal for best taking lens positioning is provided by a null value—i.e., the same intensity variances (RMS-squared) described above when subtracted yield a resulting null indication of best focus.

Although what is considered to be the preferred embodiments of the invention have been described in detail, it will be manifest that many modifications may be made therein without departing from the essential spirit of the invention. It is intended, therefore, in the annexed claims to cover all such changes and modifications as may fall within the true scope of the invention.

PARTS LIST lens-to-object cone 10
imaging or taking lens 12
image capture or film plane 14
field lens 16
quick return mirror 18
AF lenslets or microlenses 20, 22
microlens and linear array assembly 24
single AF lens 26
sensor image plane 28
photosensor or CCD arrays 30, 32
n elements $30_1$–$30_n$, $32_1$–$32_n$
lens adjustment mechanism 34
micro-controller 36
lens drive motor 38
half-silvered areas 40, 42
reflective mirror 44
photometric array 46
common linkage 48 data line 62
focus adjustment driver 64
exposure adjustment driver 66
AE and AF circuit block diagram 70
amplifier and signal processing circuits 72 and 74
correlation and interpolation circuit 75
latches 76
multi-plexor circuit 78
control logic 80
steps S100–S210

What is claimed is:

1. An auto focus control system for a camera taking lens that supplies correction signals for adjusting said taking lens so that an object is maintained at a best focus position for capturing an image of the object on an image plane regardless of the taking lens-to-object distance, said system comprising:

first and second linear arrays of photosensitive elements spaced apart laterally from one another a predetermined distance to provide parallax lens-to-object distance estimation and spaced apart in separate planes equally distanced with respect to a sensor image plane along an auto focus optical axis to provide contrast best focus confirmation of the adjustment of the taking lens;

first and second auto focus lenses for imaging the object to be photographed upon the first and second linear arrays for recording first and second light intensity pattern related output signal sets of image data; and means for processing the first and second output signal sets and adjusting the focus of the object by the taking lens.

2. The auto focus control system of claim 1 wherein said processing means further comprises:

means for correlating the first and second output signal sets and deriving an estimation of the taking lens-to-object distance through parallax range finding;

means responsive to the estimated taking lens-to-object distance for providing a taking lens drive signal;

means for driving the taking lens toward a best focus position in response to the taking lens drive signal;

means for correlating the first and second output signal sets as the taking lens is driven and deriving the maximum autocorrelation peak value indicative of the attainment of taking lens best focus position; and means for halting the taking lens drive signal upon attainment of the maximum autocorrelation peak value.

3. The auto focus control system of claim 2 wherein the attainment of maximum autocorrelation peak value is determined by successive comparisons of the change in auto correlation peak value to a threshold value.

4. The auto focus control system of claim 1 wherein said processing means further comprises:

means for correlating the first and second output signal sets and deriving an estimation of the taking lens-to-object distance through parallax range finding;

means responsive to the estimated taking lens-to-object distance for providing a taking lens drive signal;

means for driving the taking lens toward a best focus position in response to the taking lens drive signal;

means for comparing values of the first and second output signal sets and determining the difference between the signal set values; and means for halting the taking lens drive signal when the difference between the signal set values is minimal.

5. An auto focus control system for a camera taking lens that supplies correction signals for adjusting said taking lens so that an object is maintained at a best focus position for capturing an image of the object on an image plane regardless of the taking lens-to-object distance, said system comprising:

first and second linear arrays of photosensitive elements spaced apart laterally from one another a predetermined distance to provide parallax lens-to-object distance estimation and spaced apart in separate planes equally distanced with respect to a sensor image plane along an auto focus optical axis to provide contrast best focus confirmation of the adjustment of the taking lens;

first and second auto focus lenses for imaging the object to be photographed upon the first and second linear arrays for recording first and second light intensity pattern related output signal sets of image data;

means for autocorrelating said first and second signal sets;

means for employing parallax range derivation from the autocorrelation of said first and second signal sets to derive a motor drive signal means for applying the motor drive signal to the taking lens focus adjustment mechanism to adjust the taking lens focus position;

means for deriving contrast from the magnitudes of said first and second signal sets during adjustment of the taking lens; and means for halting adjustment of the taking lens when a position of best focus is indicated by the contrast derivation.

6. A method of providing auto focus control for a camera taking lens that supplies correction signals for adjusting said taking lens so that an object is maintained at a best focus position for capturing an image of the object on an image plane regardless of the taking lens-to-object distance, said method comprising the steps of:

positioning first and second linear arrays of photosensitive elements spaced apart laterally from one another a predetermined distance to provide parallax lens-to-object distance estimation and spaced apart in separate planes equally distanced from with respect to a sensor image plane along an auto focus axis to provide contrast best focus confirmation of the taking lens with respect to the object;

imaging the object to be photographed upon the first and second linear arrays for recording first and second light intensity pattern related output signal sets of image data;

autocorrelating said first and second signal sets;

employing parallax range derivation from the autocorrelation of said first and second signal sets to derive a motor drive signal applying the motor drive signal to the taking lens focus adjustment mechanism to adjust the taking lens focus position;

deriving contrast from the magnitudes of said first and second signal sets during adjustment of the taking lens; and halting adjustment of the taking lens when a position of best focus is indicated by the contrast derivation.

* * * * *